US012620285B2

(12) United States Patent
Shin et al.

(10) Patent No.: US 12,620,285 B2
(45) Date of Patent: May 5, 2026

(54) METHOD FOR GENERATING HOMOMORPHIC ENCRYPTED MESSAGE INCLUDING VOTE ANALYSIS DATA AND ELECTRONIC APPARATUS THEREFOR

(71) Applicant: CRYPTO LAB INC., Seoul (KR)

(72) Inventors: Junbum Shin, Seoul (KR); Dongyeon Hong, Seoul (KR); Jaebeom An, Yongin-si (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 18/356,113

(22) Filed: Jul. 20, 2023

(65) Prior Publication Data

US 2024/0127656 A1      Apr. 18, 2024

(30) Foreign Application Priority Data

Oct. 7, 2022      (KR) ......................... 10-2022-0128951

(51) Int. Cl.
*G07C 13/00*      (2006.01)
*H04L 9/00*      (2022.01)

(52) U.S. Cl.
CPC .............. *G07C 13/00* (2013.01); *H04L 9/008* (2013.01)

(58) Field of Classification Search
CPC ..... G07C 13/00; H04L 9/008; H04L 2209/46; H04L 2209/463
See application file for complete search history.

(56) References Cited

U.S. PATENT DOCUMENTS 5,495,532 A * 2/1996 Kilian ................... H04L 9/3218
                                                          713/180
10,223,547 B2 * 3/2019 Rane ...................... H04L 9/008
                    (Continued)

FOREIGN PATENT DOCUMENTS

KR          100999346 B1      12/2010
WO          2001/020562 A2      3/2001
WO      WO-2019165906 A1 *  9/2019 ........... H04L 9/3263
WO          2021/256843 A1      12/2021

OTHER PUBLICATIONS

WO2019165906, English translation. (Year: 2019).*
                    (Continued)

*Primary Examiner* — Thien M Le
*Assistant Examiner* — Asifa Habib
(74) *Attorney, Agent, or Firm* — Steinfl + Bruno LLP

(57) ABSTRACT

An electronic apparatus which generates a homomorphic encrypted message by homomorphically encrypting voting analysis data includes: a processor configured to execute the at least one instruction, wherein the processor is configured to generate a vote-homomorphic encrypted message including the voting data of the voter for a first candidate and a second candidate by using a first candidate mask corresponding to the first candidate in a first election and a second candidate mask corresponding to the second candidate in a second election, for a first election-homomorphic encrypted message acquired by homomorphically encrypting the voting data of the voter in the first election and a second election-homomorphic encrypted message acquired by homomorphically encrypting the voting data in the second election, and generate a result-homomorphic encrypted message including the number of voters who select the first candidate and the second candidate by using the generated vote-homomorphic encrypted message.

9 Claims, 6 Drawing Sheets

(56) References Cited

U.S. PATENT DOCUMENTS

| | | | | |
|---|---|---|---|---|
| 11,532,195 | B2 * | 12/2022 | Komo | H04L 63/12 |
| 2008/0226151 | A1 * | 9/2008 | Zouridakis | G06T 7/0012 |
| | | | | 600/300 |
| 2016/0019394 | A1 * | 1/2016 | Ioannidis | G06F 21/602 |
| | | | | 726/26 |
| 2018/0350180 | A1 * | 12/2018 | Onischuk | G07C 13/00 |
| 2019/0036678 | A1 * | 1/2019 | Ahmed | H04L 9/008 |
| 2019/0386814 | A1 * | 12/2019 | Ahmed | H04L 9/008 |
| 2020/0082126 | A1 * | 3/2020 | Brown | G06Q 20/401 |
| 2021/0343101 | A1 | 11/2021 | Komo et al. | |
| 2022/0038277 | A1 * | 2/2022 | Bourse | H04L 9/0643 |
| 2022/0327882 | A1 * | 10/2022 | Komo | G07C 13/005 |
| 2022/0358237 | A1 * | 11/2022 | Banipal | G06N 20/00 |
| 2023/0096614 | A1 * | 3/2023 | Lyon | G07C 13/00 |
| | | | | 235/51 |
| 2023/0208611 | A1 * | 6/2023 | Cheon | H04L 9/008 |
| | | | | 380/28 |
| 2023/0289469 | A1 * | 9/2023 | Uzun | H04L 9/0866 |

OTHER PUBLICATIONS

Office Action with English translation for Korean Patent Application 10-2022-0128951 filed Oct. 7, 2022 on behalf of Crypto Lab Inc., Mail Date: Feb. 20, 2025. 14 pages.
Office Action with English translation for Korean Patent Application 10-2022-0128951 filed Oct. 7, 2022 on behalf of Crypto Lab Inc., Mail Date: Oct. 21, 2025. 14 pages.

* cited by examiner

| FIRST \ SECOND | 1 | 2 | 3 | 4 |
|---|---|---|---|---|
| 1 | 10 | 0 | 0 | 0 |
| 2 | K | 15 | 0 | 0 |
| 3 | 0 | 0 | 30 | 0 |
| 4 | 0 | 0 | 10 | 30 |

FIG. 6

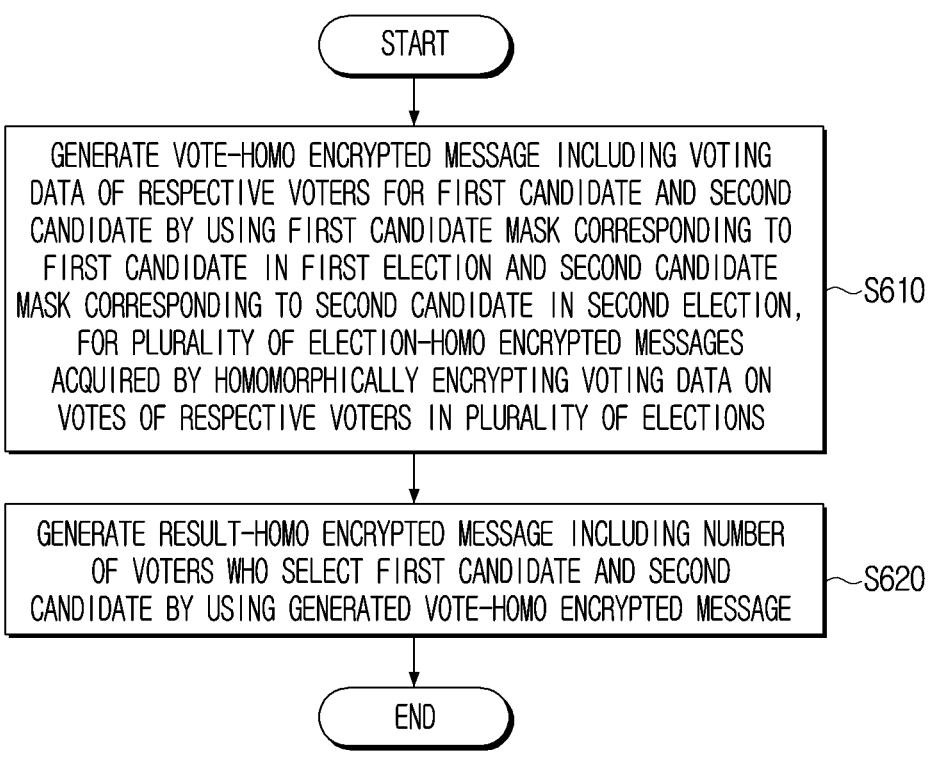

START

GENERATE VOTE-HOMO ENCRYPTED MESSAGE INCLUDING VOTING DATA OF RESPECTIVE VOTERS FOR FIRST CANDIDATE AND SECOND CANDIDATE BY USING FIRST CANDIDATE MASK CORRESPONDING TO FIRST CANDIDATE IN FIRST ELECTION AND SECOND CANDIDATE MASK CORRESPONDING TO SECOND CANDIDATE IN SECOND ELECTION, FOR PLURALITY OF ELECTION-HOMO ENCRYPTED MESSAGES ACQUIRED BY HOMOMORPHICALLY ENCRYPTING VOTING DATA ON VOTES OF RESPECTIVE VOTERS IN PLURALITY OF ELECTIONS — S610

GENERATE RESULT-HOMO ENCRYPTED MESSAGE INCLUDING NUMBER OF VOTERS WHO SELECT FIRST CANDIDATE AND SECOND CANDIDATE BY USING GENERATED VOTE-HOMO ENCRYPTED MESSAGE — S620

END

METHOD FOR GENERATING HOMOMORPHIC ENCRYPTED MESSAGE INCLUDING VOTE ANALYSIS DATA AND ELECTRONIC APPARATUS THEREFOR

CROSS-REFERENCE TO RELATED APPLICATION(S)

This application claiming priority of a Korean patent application number 10-2022-0128951, filed on Oct. 7, 2022, in the Korean Intellectual Property Office, the disclosure of which is incorporated by reference herein in its entirety.

BACKGROUND

Field

Apparatuses and method for generating a homomorphic encrypted message methods consistent with the disclosure relate to a method for generating a homomorphic encrypted message including voting analysis data and an electronic apparatus therefor, and more particularly, to a method for generating a homomorphic encrypted message including voting analysis data by performing time-sequential analysis on voting change data in a homogeneous voting system, and an apparatus therefor.

Description of the Related Art

Various services for transmitting and receiving data between various devices are supported in accordance with the development of electronic and communication technologies. As one example of the various services, a cloud computing service in which a user stores his/her personal data or the like in a server, and uses the data in the server is also actively used.

In this environment, it is essential to use a security technology for preventing data leakage. Therefore, the server may store encrypted data. In this case, the server is required to decrypt the encrypted data in every case of searching for the stored data or performing a series of operations based on the data, which may cause waste of resources and time.

In addition, the personal data may be easily leaked to a third party in case that the data temporarily decrypted for calculation in the server is hacked by the third party.

A homomorphic encryption method is being studied to solve this problem. In case that the homomorphic encryption method is used, it is possible to acquire the same result as an encrypted value acquired by performing calculation on a plaintext even though the calculation is performed on the encrypted message itself without decrypting the encrypted data. Therefore, various calculations may be performed without decrypting the encrypted message.

Meanwhile, a method for applying homomorphic encryption is being proposed in a voting system as well. Voting data may have a high possibility of revealing individual political inclinations or personal characteristics, and voting using the homomorphic encryption is proposed to protect individual privacy in an online voting system.

The voting system requires time-sequential analysis on the voting data. However, every voting result in a plain text format needs to be stored for this purpose even though the time-sequential analysis is possible in an unencrypted state. Therefore, there has been a great concern about individual privacy violation.

SUMMARY

The disclosure aims to perform time-sequential analysis on homomorphically-encrypted voting data in a homogeneous voting system in which voting data is homomorphically encrypted to generate a homomorphic encrypted message including voting analysis data.

According to an embodiment of the disclosure, an electronic apparatus includes: a memory storing at least one instruction and a plurality of election-homomorphic encrypted messages acquired by homomorphically encrypting voting data on votes of a plurality of voters in a plurality of elections; and a processor configured to execute the at least one instruction, wherein the processor is configured to generate a vote-homomorphic encrypted message including the voting data of the voter for a first candidate and a second candidate by using a first candidate mask corresponding to the first candidate in a first election and a second candidate mask corresponding to the second candidate in a second election, for a first election-homomorphic encrypted message acquired by homomorphically encrypting the voting data of the voter in the first election and a second election-homomorphic encrypted message acquired by homomorphically encrypting the voting data in the second election, and generate a result-homomorphic encrypted message including the number of voters who select the first candidate and the second candidate by using the generated vote-homomorphic encrypted message.

The first election-homomorphic encrypted message or the second election-homomorphic encrypted message may have at least one slot, the at least one slot of the first election-homomorphic encrypted message or the second election-homomorphic encrypted message may correspond to at least one candidate running for the first election or the second election, and 1 may be a value in a slot corresponding to a candidate voted for by the voter in the first election or the second election, and zero in the other slots among the at least one slot.

The processor may be configured to generate the first candidate mask or the second candidate mask having at least one slot, the first candidate mask may have the at least one slot corresponding to each candidate running for the first election, and 1 may be a value in a slot corresponding to the first candidate, and zero in the other slots among the at least one slot of the first candidate mask, and the second candidate mask may have the at least one slot corresponding to each candidate running for the second election, and 1 may be a value in a slot corresponding to the second candidate, and zero in the other slots among the at least one slot of the second candidate mask.

The vote-homomorphic encrypted message may have one slot, 1 may be a value in the slot of the vote-homomorphic encrypted message in case that the voter votes for both the first candidate and the second candidate, and zero in the other cases, and the processor may be configured to generate the result-homomorphic encrypted message by homomorphically summing the vote-homomorphic encrypted messages of the respective voters.

The processor may be configured to generate a first vote-homomorphic encrypted message including the voting data of the respective voters for the first candidate by using the first election-homomorphic encrypted messages acquired by homomorphically encrypt the voting data of the respective voters in the first election and the first candidate mask corresponding to the first candidate in the first election, generate a second vote-homomorphic encrypted message including the voting data of the respective voters for the second candidate by using the second election-homomorphic encrypted messages acquired by homomorphically encrypt the voting data of the respective voters in the second election and the second candidate mask corresponding to the second candidate in the second election, and generate the vote-homomorphic encrypted message including the voting data of the voter for the first candidate and the second candidate by homomorphically multiplying the first vote-homomorphic encrypted message by the second vote-homomorphic encrypted message.

The first vote-homomorphic encrypted message or the second vote-homomorphic encrypted message may have one slot, 1 may be a value in the slot of the first vote-homomorphic encrypted message in case that the voter votes for the first candidate, and zero in the other cases, and 1 may be a value in the slot of the second vote-homomorphic encrypted message in case that the voter votes for the second candidate, and zero in the other cases.

The processor may be configured to generate a table having dimensions corresponding to the number of times of the plurality of elections, and store the result-homomorphic encrypted message in one of a plurality of cells included in the generated table.

According to another embodiment of the disclosure, a method for generating a homomorphic encrypted message including voting analysis data includes: generating a vote-homomorphic encrypted message including voting data of respective voters for a first candidate and a second candidate by using a first candidate mask corresponding to the first candidate in a first election and a second candidate mask corresponding to the second candidate in a second election, for a plurality of election-homomorphic encrypted messages acquired by homomorphically encrypting the voting data of the respective voters in a plurality of elections, and generating a result-homomorphic encrypted message including the number of voters who select the first candidate and the second candidate by using the generated vote-homomorphic encrypted message.

The election-homomorphic encrypted message may have at least one slot corresponding to each candidate running for the first election or the second election, and 1 may be a value in the slot in a slot corresponding to a candidate voted for by the voter in the first election or the second election, and zero in the other slots among the at least one slot.

The method may further include generating the first candidate mask or the second candidate mask having at least one slot, wherein the first candidate mask has the at least one slot corresponding to each candidate running for the first election, and 1 is a value in a slot corresponding to the first candidate, and zero in the other slots among the at least one slot of the first candidate mask, and the second candidate mask has the at least one slot corresponding to each candidate running for the second election, and 1 is a value in a slot corresponding to the second candidate, and zero in the other slots among the at least one slot of the second candidate mask.

The vote-homomorphic encrypted message may have one slot, 1 may be a value in the slot of the vote-homomorphic encrypted message in case that the voter votes for both the first candidate and the second candidate, and zero in the other cases, and in the generating of the result-homomorphic encrypted message, the result-homomorphic encrypted message may be generated by homomorphically summing the vote-homomorphic encrypted messages of the respective voters.

The generating of the vote-homomorphic encrypted message may include: generating a first vote-homomorphic encrypted message including the voting data of the respective voters for the first candidate by using first election-homomorphic encrypted messages acquired by homomorphically encrypting the voting data of the voters in the first election and the first candidate mask corresponding to the first candidate in the first election; generating a second vote-homomorphic encrypted message including the voting data of the respective voters for the second candidate by using second election-homomorphic encrypted messages acquired by homomorphically encrypting the voting data of the voters in the second election and the second candidate mask corresponding to the second candidate in the second election; and generating the vote-homomorphic encrypted message including the voting data of the voter for the first candidate and the second candidate by homomorphically multiplying the first vote-homomorphic encrypted message by the second vote-homomorphic encrypted message.

The first vote-homomorphic encrypted message or the second vote-homomorphic encrypted message may have one slot, 1 may be a value in the slot of the first vote-homomorphic encrypted message in case that the voter votes for the first candidate, and zero in the other cases, and 1 may be a value in the slot of the second vote-homomorphic encrypted message in case that the voter votes for the second candidate, and zero in the other cases.

The method may further include: generating a table having dimensions corresponding to the number of times of the plurality of elections; and storing the result-homomorphic encrypted message in one of a plurality of cells included in the generated table.

According to still another embodiment of the disclosure, provided is a computer-readable recording medium which includes a program for executing a method for generating a homomorphic encrypted message including voting analysis data, wherein the method includes: generating a vote-homomorphic encrypted message including voting data of respective voters for a first candidate and a second candidate by using a first candidate mask corresponding to the first candidate in a first election and a second candidate mask corresponding to the second candidate in a second election, for a plurality of election-homomorphic encrypted messages acquired by homomorphically encrypting the voting data of the respective voters in a plurality of elections, and generating a result-homomorphic encrypted message including the number of voters who select the first candidate and the second candidate by using the generated vote-homomorphic encrypted message.

BRIEF DESCRIPTION OF THE DRAWINGS

FIG. 5 is a view for explaining a data frame in which a result-homomorphic encrypted message is stored according to an embodiment of the disclosure.

FIG. 6 is a flowchart for explaining a method for generating a homomorphic encrypted message according to another embodiment of the disclosure.

DETAILED DESCRIPTION

Figure 1:
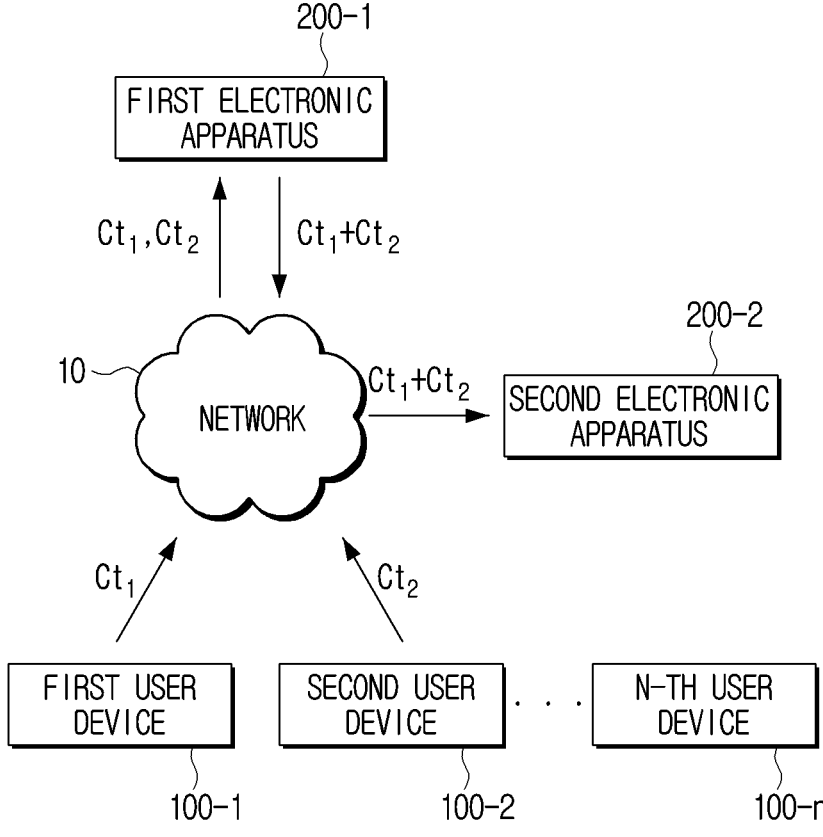
FIG. 1 is a view for explaining a structure of a network system including an electronic apparatus according to an embodiment of the disclosure.

Hereinafter, the disclosure is described in detail with reference to the accompanying drawings. Encryption/decryption may be applied as necessary to a process of transmitting data (or information) that is performed in the disclosure, and an expression describing the process of transmitting the data (or information) in the disclosure and the claims should be interpreted as including cases of the encryption/decryption even if not separately mentioned. In the disclosure, an expression such as "transmission/transfer from A to B" or "reception from A to B" may include transmission/transfer or reception while having another medium included in the middle, and may not necessarily express only the direct transmission/transfer or reception from A to B.

In describing the disclosure, a sequence of each operation should be understood as non-restrictive unless a preceding operation in the sequence of each operation needs to logically and temporally precede a subsequent operation. That is, except for the above exceptional case, the essence of the disclosure is not affected even though a process described as the subsequent operation is performed before a process described as the preceding operation, and the scope of the disclosure should also be defined regardless of the sequence of the operations. In addition, in the specification, "A or B" may be defined to indicate not only selectively indicating either one of A and B, but also including both A and B. In addition, a term "including" in the disclosure may have a meaning encompassing further including other components in addition to components listed as being included.

The disclosure only describes essential components necessary for describing the disclosure, and does not mention components unrelated to the essence of the disclosure. In addition, it should not be interpreted as an exclusive meaning that the disclosure includes only the mentioned components, but should be interpreted as a non-exclusive meaning that the disclosure may include other components as well.

In addition, in the disclosure, a "value" may be defined as a concept that includes a vector or a polynomial form as well as a scalar value.

Mathematical calculations or computations of each step in the disclosure described below may be implemented as computer calculations by a known coding method and/or coding designed to be suitable for the disclosure to perform the corresponding calculations or computations.

Specific equations described below are exemplarily described among possible alternatives, and the scope of the disclosure should not be construed as being limited to the equations mentioned in the disclosure.

For convenience of description, the disclosure defines the following notations:

a←D: Select an element a according to distribution D.

s1, s2∈R: Each of s1 and s2 is an element belonging to a set R.

mod(q): Perform modular calculation with an element q.

⌊·⌉: Round an internal value.

Hereinafter, various embodiments of the disclosure are described in detail with reference to the accompanying drawings.

FIG. 1 is a view for explaining a structure of a network system according to an embodiment of the disclosure.

Referring to FIG. 1, the network system may include a plurality of user devices 100-1 to 100-n, a first electronic apparatus 200-1, and a second electronic apparatus 200-2, and the respective components may be connected to each other through a network 10.

Here, the network 10 may be implemented in any of various types of wired and wireless communication networks, broadcast communication networks, optical communication networks, cloud networks, or the like, and the respective devices may be connected to each other in a way such as wireless-fidelity (Wi-Fi), Bluetooth, near field communication (NFC), or the like without a separate medium.

Even though FIG. 1 shows the plurality of user devices 100-1 to 100-n, the plurality of user devices may not necessarily be used, and a single device may be used. For example, the user devices 100-1 to 100-n may be implemented in various types of devices such as smartphones, tablets, game players, personal computers (PCs), laptop PCs, home servers, or kiosks, and may also be implemented in other types of home appliances each having an Internet of things (IoT) function.

A user may input various data through the user devices 100-1 to 100-n used by the user. The input data may be stored in the user devices 100-1 to 100-n themselves, and may also be transmitted and stored in an external device for storage capacity or a security reason. As shown in FIG. 1, the first electronic apparatus 200-1 may serve to store these data, and the second electronic apparatus 200-2 may serve to use some or all of the data stored in the first electronic apparatus 200-1.

Each of the user devices 100-1 to 100-n may homomorphically encrypt the input data and transmit a homomorphic encrypted message (or homomorphic ciphertext, homomorphic cyphertext) to the first electronic apparatus 200-1.

For example, each of the user devices 100-1 to 100-n may generate the plurality of homomorphic encrypted messages by homomorphically encrypting each of user voting data in a plurality of elections, and transmit the generated homomorphic encrypted message to the first electronic apparatus 200-1.

Each of the user devices 100-1 to 100-n may an error, i.e. an encryption noise computed in a process of performing the homomorphic encryption, in the encrypted message. In detail, the homomorphic encrypted message generated by each of the user devices 100-1 to 100-n may be generated for a result value including the message and an error value to be restored in case that decryption is performed thereon using a secret key later.

For example, the homomorphic encrypted message generated by each of the user devices 100-1 to 100-n may be generated for the following properties to be satisfied in case that the message is decrypted using the secret key.

$$Dec(ct, sk) = M + e(\bmod q) \qquad \text{[Equation 1]}$$

Here, < and > indicate dot-product calculation (or usual inner product), ct indicates the encrypted message, sk indicates the secret key, M indicates a plaintext message, e indicates an encryption error value, and mod q indicates a modulus of the encrypted message. Here, q needs to be chosen larger than the result value M multiplied by a scaling factor $\Delta$ to the message. In case that an absolute value of the error value e is sufficiently smaller than M, a decryption value M+e of the encrypted message may be a value which may replace an original message by the same precision in significant figure calculation. Among the decrypted data, the error may be disposed on the least significant bit (LSB) side, and M may be disposed on the next least significant bit side.

In case that a size of the message is too small or too large, the size may be adjusted using the scaling factor. In case that the scaling factor is used, not only a message in an integer form but also a message in a real number form may be encrypted, and its usability may thus be greatly increased. In addition, the size of the message may be adjusted using the scaling factor to thus also adjust a size of a region where the messages exist, that is, a size of an effective region in the encrypted message after the calculation is performed.

In some embodiments, the modulus q of the encrypted message may be set and used in various forms. For example, the modulus of the encrypted message may be set in the form of an exponential power $q=\Delta^L$ of the scaling factor $\Delta$. If $\Delta$ is 2, the modulus may be set to a value such as $q=2^{10}$.

In addition, the homomorphic encrypted message according to the disclosure is described assuming that a fixed point is used. However, the homomorphic encrypted message may also be applied even in case that a floating point is used.

The first electronic apparatus 200-1 may store the received homomorphic encrypted message as the encrypted message without the decryption.

The first electronic apparatus 200-1 may store the plurality of homomorphic encrypted messages acquired by homomorphically encrypting the voting data in the plurality of elections that are received from the user devices 100-1 to 100-*n* without the decryption.

The second electronic apparatus 200-2 may request a specific processing result of the homomorphic encrypted message from the first electronic apparatus 200-1. The first electronic apparatus 200-1 may perform specific calculation based on the request of the second electronic apparatus 200-2 and transmit the result to the second electronic apparatus 200-2.

For example, encrypted messages ct1 and ct2 transmitted by two user devices 100-1 and 100-2 may be stored in the first electronic apparatus 200-1. In this case, the second electronic apparatus 200-2 may request sum of data provided from the two user devices 100-1 and 100-2 to the first electronic apparatus 200-1. The first electronic apparatus 200-1 may perform calculation of summing the two encrypted messages based on the request, and then transmit a result value ct1+ct2 to the second electronic apparatus 200-2.

Due to a nature of the homomorphic encrypted message, the first electronic apparatus 200-1 may perform the calculation without the decryption, and the result value may also be in a form of the encrypted message. In the disclosure, the result value acquired by the calculation is referred to as a calculation-result encrypted message (or a calculation-result ciphertext).

The first electronic apparatus 200-1 may transmit the calculation-result encrypted message to the second electronic apparatus 200-2. The second electronic apparatus 200-2 may decrypt the received calculation-result encrypted message to thus acquire the calculation-result values of data included in each homomorphic encrypted message.

Meanwhile, FIG. 1 shows a case where the user devices 100-1 to 100-*n* perform the encryption, the first electronic apparatus 200-1 performs the calculations requested by the second electronic apparatus 200-2, and the second electronic apparatus 200-2 performs the decryption on the homomorphic encrypted message received from the first electronic apparatus 200-1. However, the disclosure is not necessarily limited thereto.

For example, one electronic apparatus 200 may perform the operations performed by the first electronic apparatus 200-1 and the second electronic apparatus 200-2. That is, the electronic apparatus 200 may perform the calculation on the homomorphic encrypted message and decrypt the calculation-result encrypted message including the calculation-result value.

Meanwhile, in another example, the user devices 100-1 to 100-*n*, the first electronic apparatus 200-1 and the second electronic apparatus 200-2 of FIG. 1 may be implemented as one electronic apparatus 200, and the electronic apparatus 200 may perform the homomorphic encryption on the message, perform the calculation on the homomorphic encrypted message, and then decrypt the calculation-result encrypted message including the calculation-result value.

Figure 2:
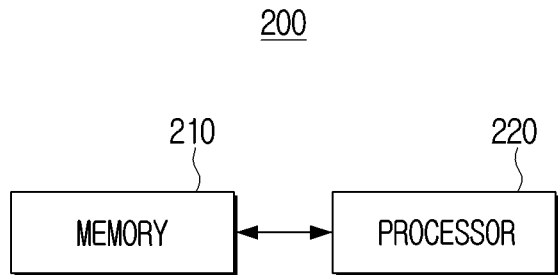
FIG. 2 is a block diagram for explaining a configuration of the electronic apparatus according to an embodiment of the disclosure.

FIG. 2 is a view for explaining a configuration of the electronic apparatus according to an embodiment of the disclosure;

As shown in FIG. 2, the electronic apparatus 200 may include a memory 210 and a processor 220. Here, the electronic apparatus 200 may be various devices such as a personal computer (PC), a laptop computer, a smartphone, a tablet, and a server.

The memory 210 may store at least one instruction related to the electronic apparatus 200. For example, the memory 210 may store various programs (or software) for operating the electronic apparatus 200 according to various embodiments of the disclosure.

The memory 210 may be implemented in any of various forms such as a random access memory (RAM), a read-only memory (ROM), a buffer, a cache, a flash memory, a hard disk drive (HDD), an external memory, and a memory card, and is not limited to any one of these forms.

The memory 210 may store a message to be encrypted. Here, the messages may be various credit data, personal data, or the like cited by the user in various ways, and may also be data on a usage history such as position data or internet usage time data, used by the electronic apparatus 200.

The memory 210 may store a public key. In case that the electronic apparatus 200 directly generates the public key, the memory 210 may store not only the secret key but also various parameters necessary for generating the public key and the secret key.

The memory 210 may store the homomorphic encrypted messages acquired by homomorphically encrypting various data.

The memory 210 may store a plurality of election-homomorphic encrypted messages acquired by homomorphically encrypting the voting data on votes of a plurality of voters in the plurality of elections. The description describes the election-homomorphic encrypted message below with reference to FIG. 3.

In addition, the memory 210 may store the homomorphic encrypted message generated in a process described below. In addition, the memory 210 may store the homomorphic encrypted message that is a result of a calculation process described below.

In detail, the memory 210 may store a candidate mask-homomorphic encrypted message generated in a process of analyzing the voting data of the plurality of voters, a vote-homomorphic encrypted message acquired by homomorphically encrypting the voting data of the voters for a candidate, and a result-homomorphic encrypted message acquired by homomorphically encrypting the number of voters who select the plurality of candidates. The description describes each homomorphic encrypted message in detail below with reference to FIG. 4.

The processor 220 may control an overall operation of the electronic apparatus 200. For example, the processor 220 may control the overall operation of the electronic apparatus 200 by executing at least one instruction stored in the memory 210. The processor 220 may include a single device such as a central processing unit (CPU) or an application-specific integrated circuit (ASIC), or may include a plurality of devices such as the CPU and a graphics processing unit (GPU).

In case that a message is input, the processor 220 may store the same in the memory 210. Here, the message may be a message including the user voting data.

The processor 220 may homomorphically encrypt the message including the voting data by using various set values and programs stored in the memory 210. In this case, the processor 220 may use the public key.

The processor 220 may directly generate and use the public key and the secret key which are required to perform the encryption and the decryption, or may receive and use the keys from the external device. For example, the processor 220 may generate the public key and the secret key and distribute the public key to other external devices.

In case of directly generating the key, the processor 220 may generate the public key by using a Ring-LWE method. For example, the processor 220 may first set the various parameters and Rings and store the same in the memory 210. Examples of the parameters may include a length of a plaintext message bit, a size of the public key, a size of the secret key, and the like.

The Ring may be expressed as Equation 2 below.

$$R = \frac{Z_q[X]}{f(x)} \qquad \text{[Equation 2]}$$

Here, R indicates the Ring, $Z_q$ indicates a coefficient, and f(x) indicates an n-th order polynomial.

The Ring indicates a set of polynomials having predetermined coefficients, and indicates the set in which addition and multiplication are defined between elements and are closed for the addition and multiplication. The Ring may be referred to as a ring.

For example, the ring indicates a set of the n-th order polynomials having the coefficient $Z_q$. For example, in case that n indicates $\Phi(N)$, the ring indicates an n-th cyclotomic polynomial. Here, f(x) indicates ideal of $Z_q[x]$ generated by f(x). The Euler totient function $\Phi(N)$ indicates the number of natural numbers that are prime to N and smaller than N. If $\Phi N(x)$ is defined as the n-th cyclotomic polynomial, the ring may also be expressed in Equation 3 as follows. Here, N may be $2^{17}$.

$$R = \frac{Z_q[X]}{\Phi_N(x)} \qquad \text{[Equation 3]}$$

The secret key sk may be expressed as follows.

Meanwhile, the ring of Equation 3 described above has a complex number in a plaintext space. Meanwhile, only a set in which the plaintext space is a real number among the sets of rings described above may be used to improve a speed for calculating the homomorphic encrypted message.

In case that the ring is set, the processor 220 may compute the secret key sk from the ring.

$$sk \leftarrow (1, s(x)), s(x) \in R \qquad \text{[Equation 4]}$$

Here, s(x) indicates a random polynomial generated using a small coefficient.

In addition, the processor 220 may compute a first random polynomial a(x) from the ring. The first random polynomial may be expressed as follows.

$$a(x) \leftarrow R \qquad \text{[Equation 5]}$$

In addition, the processor 220 may compute an error. For example, the processor 220 may extract the error from a discrete Gaussian distribution or a distribution having a statistical distance close thereto. This error may be expressed as follows.

$$e(x) \leftarrow D^n_{\alpha q} \qquad \text{[Equation 6]}$$

In case that the error is computed, the processor 220 may compute a second random polynomial by modularly calculating the error in the first random polynomial and the secret key. The second random polynomial may be expressed as follows.

$$b(x) = -a(x)s(x) + e(x)(\mathrm{mod}\ q) \qquad \text{[Equation 7]}$$

Finally, a public key pk is set to include the first random polynomial and the second random polynomial as follows.

$$pk = (b(x), a(x)) \qquad \text{[Equation 8]}$$

The method for generating the key described above is only an example, the disclosure is not necessarily limited thereto, and the public key and the secret key may be generated by another method.

Meanwhile, in case that the public key is generated, the processor 220 may control a communication device (not shown) to transmit the generated public key to another device.

In addition, the processor 220 may generate the homomorphic encrypted message for the message. For example, the processor 220 may generate the homomorphic encrypted message by applying a previously-generated public key to the message.

In case that the generated homomorphic encrypted message is decrypted, the message may be restored as the result value acquired by adding the error to a value reflecting the scaling factor to the message. The scaling factor may use a value previously input and set as it is.

Alternatively, the processor 220 may perform the encryption by using the public key immediately after multiplying the message by the scaling factor. In this case, the error computed in an encryption process may be added to the result value acquired by multiplying the message by the scaling factor.

In addition, the processor 220 may generate the encrypted message to have a length corresponding to a size of the scaling factor.

In case that the homomorphic encrypted message is generated, the processor 220 may store the encrypted message in the memory 210 or control the communication device (not shown) to transmit the homomorphic encrypted message to another device based on a user request or a predetermined default instruction.

In case that the homomorphic encrypted message is required to be decrypted, the processor 220 may apply the secret key to the homomorphic encrypted message to generate a polynomial decrypted text, and decode the polynomial decrypted text to generate the message. Here, the generated message may include the error as mentioned in Equation 1 described above.

Meanwhile, according to an embodiment of the disclosure, the processor 220 may perform time-sequential analysis on the plurality of election-homomorphic encrypted messages acquired by homomorphically encrypting the voting data on the votes of the plurality of voters in the plurality of elections, and generate the result-homomorphic encrypted message including an analysis result.

In detail, the processor 220 may generate the vote-homomorphic encrypted message including the voting data of the voter for a first candidate and a second candidate by using a first candidate mask corresponding to the first candidate in a first election, and a second candidate mask corresponding to the second candidate in a second election, for a first election-homomorphic encrypted message acquired by homomorphically encrypting the voting data of the voter in the first election, and a second election-homomorphic encrypted message acquired by homomorphically encrypting the voting data in the second election.

For example, the processor 220 may generate the vote-homomorphic encrypted message including whether the voter votes for the first candidate and the second candidate by using the first candidate mask and the second candidate mask for the first election-homomorphic encrypted message and second election-homomorphic encrypted message of the voter.

Here, the vote-homomorphic encrypted message may have one slot. 1 may be a value in the slot of the vote-homomorphic encrypted message in case that the voter votes for both the first candidate and the second candidate, and zero in the other cases (for example, the voter votes for none of the first candidate and the second candidate, votes for a candidate other than the first candidate in the first election, or votes for a candidate other than the second candidate in the second election).

In addition, the processor 220 may generate the result-homomorphic encrypted message including the number of voters who select the first candidate and the second candidate by using the vote-homomorphic encrypted message generated for the respective voters. In detail, the processor 220 may generate the result-homomorphic encrypted message including the number of voters who select the first candidate and the second candidate by homomorphically summing the generated vote-homomorphic encrypted messages of the respective voters.

Accordingly, in case of decrypting the result-homomorphic encrypted message, the processor 220 may identify the number of voters who select the first candidate in the first election and select the second candidate in the second election.

The description describes a detailed process of generating the result-homomorphic encrypted message below with reference to FIG. 4.

Meanwhile, the processor 220 may store the generated result-homomorphic encrypted message in the form of a data frame (or table).

In detail, the processor 220 may generate a table having dimensions corresponding to the number of times of the plurality of elections. Each dimension of the generated table may include at least one index, and each index may correspond to a candidate running for each election.

The candidate in each election may correspond to the index of each dimension of the table, and the processor 220 may thus generate a table having the number of cells multiplied by the number of candidates running for each election.

The processor 220 may store the generated result-homomorphic encrypted message in one of the plurality of cells included in the generated table. A detailed description thereof is provided below with reference to FIG. 5.

Figure 3:
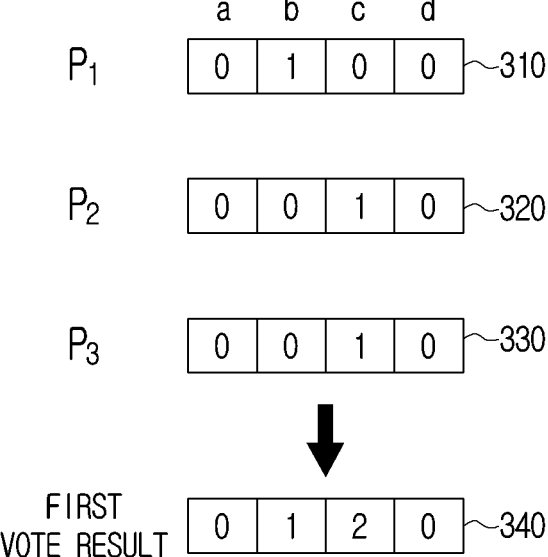
FIG. 3 is a view for explaining a homomorphic encrypted message acquired by homomorphically encrypting voting data according to an embodiment of the disclosure.

FIG. 3 is a view for explaining the homomorphic encrypted message acquired by homomorphically encrypting the voting data according to an embodiment of the disclosure.

P1, P2, and P3 in FIG. 3 indicates voters 1, 2, and 3, and election-homomorphic encrypted messages 310, 320, and 330 indicate the election-homomorphic encrypted messages of the first election that are received from the user devices 100-1, 100-2, and 100-3 of the voters 1, 2, and 3, that is, the encrypted messages acquired by homomorphically encrypting the voting data on the votes of the voters 1, 2, and 3 in the first election.

As shown in FIG. 3, the election-homomorphic encrypted message may have at least one slot.

At least one slot included in the election-homomorphic encrypted message may correspond to at least one candidate running for the election. For example, candidates a, b, c, and d may run for the first election. In this case, the election-homomorphic encrypted messages 310, 320, and 330 for the first election may each have four slots corresponding to the candidates a, b, c, and d. In addition, candidates a, b, and e may run for the second election. In this case, the election-homomorphic encrypted message for the second election may have three slots each corresponding to the candidates a, b, and e.

A value in the slot of the election-homomorphic encrypted message may be determined based on the voting data of the voter. For example, 1 may be a value in its slot corresponding to a candidate voted for by the voter, and zero in the other slots.

In the above example, the voter P1 may vote for the candidate b in the first election. In this case, the first election-homomorphic encrypted message 310 of the voter P1 may have a value of 1 in a second slot corresponding to the candidate b and a value of zero in the other slots. The voter P2 may vote for the candidate c in the first election. In this case, the first election-homomorphic encrypted message 320 of the voter P2 may have the value of 1 in a third slot corresponding to the candidate c and the value of zero in the other slots. The voter P3 may vote for the candidate c in the first election. In this case, the first election-homomorphic encrypted message 330 of the voter P3 may have the value of 1 in the third slot corresponding to the candidate c and the value of zero in the other slots.

In addition, the homomorphic encrypted message 340 including a first election-voting result may be generated in case of homomorphically summing the first election-homomorphic encrypted messages 310, 320, and 330 of the respective voters. The homomorphic encrypted message 340 including the first election-voting result may include the same number of slots as the first election-homomorphic encrypted message, and the respective slots may correspond to the plurality of candidates for the first election. In addition, each slot of the homomorphic encrypted message 340 including the first election-voting result may have the result value acquired by homomorphically summing the first election-homomorphic encrypted messages 310, 320, and 330, and indicate the number of voters who select each candidate in the election.

For example, the first election-homomorphic encrypted messages 310, 320, and 330 may be homomorphically summed to generate the homomorphic encrypted message 340 in which the second slot corresponding to the candidate b has the value of 1 and the third slot corresponding to the candidate c has a value of 2, which indicates that the number of voters who select the candidate b in the first election is 1 and the number of voters who select the candidate c is 2.

Meanwhile, FIG. 3 only shows that the first election-homomorphic encrypted message is acquired by homomorphically encrypting the voting data of the voters 1, 2, and 3 in the first election. However, the plurality of elections may be held and the votes of the voters 1, 2 and 3 may be made in the respective elections. In this case, the processor 220 may receive the election-homomorphic encrypted message for an election held after the first election and generate the vote result-homomorphic encrypted message for the election held after the first election as shown in FIG. 3.

Figure 4:
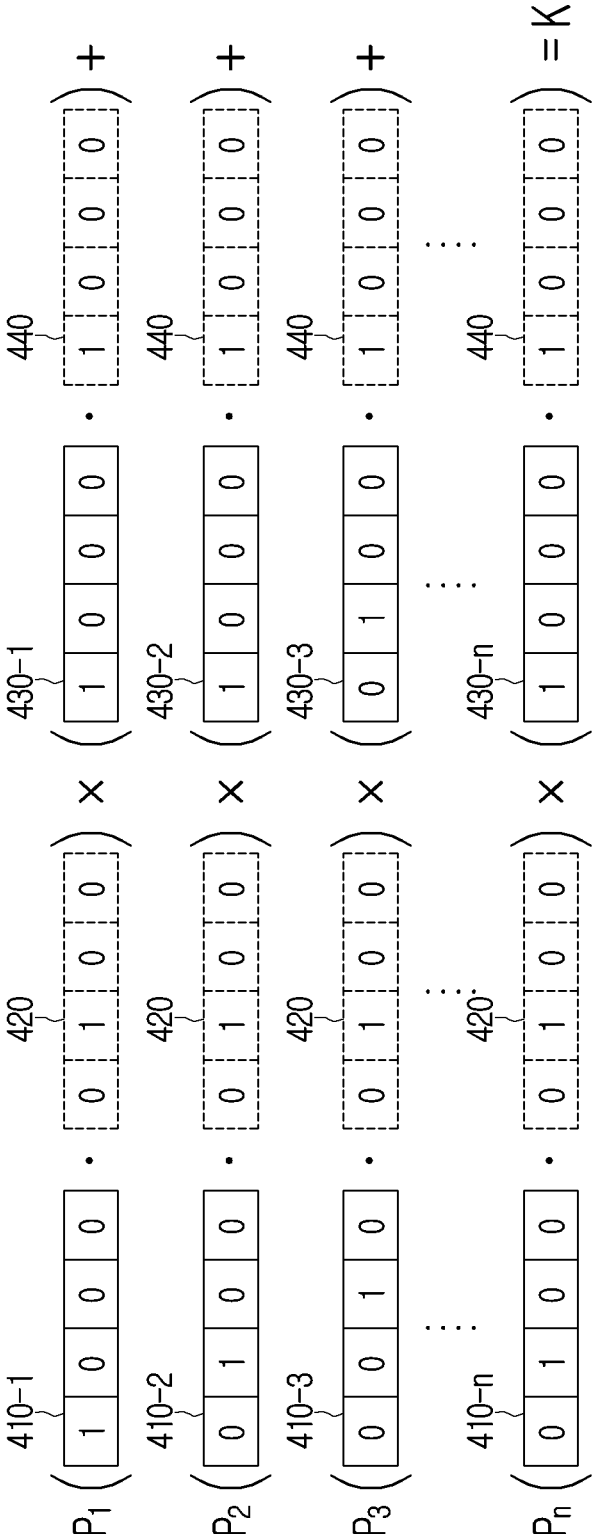
FIG. 4 is a view for explaining the electronic apparatus analyzing the voting data according to an embodiment of the disclosure.

FIG. 4 is a view for explaining the electronic apparatus analyzing the voting data according to an embodiment of the disclosure.

P1, P2, . . . , and Pn of FIG. 4 indicate the voter 1, 2, . . . , and n, and the processor 220 may generate the vote-homomorphic encrypted message including the voting data of the voter P1, P2, . . . , and Pn for the first and second candidates by using a first candidate mask 420 corresponding to the first candidate in the first election and a second candidate mask 440 corresponding to the second candidate in the second election, for the first election-homomorphic encrypted messages 410-1, 410-2, . . . , and 410-n and second election-homomorphic encrypted messages 430-1, 430-2, . . . , and 430-n of the plurality of voters P1, P2, . . . , and Pn.

The vote-homomorphic encrypted message may have one slot. Here, 1 may be a value in the slot of the vote-homomorphic encrypted message in case that the voter votes for both the first candidate and the second candidate, and zero in the other cases (for example, the voter votes for none of the first candidate and the second candidate, votes for a candidate other than the first candidate in the first election, or votes for a candidate other than the second candidate in the second election).

As described above with reference to FIG. 4, the first election-homomorphic encrypted messages 410-1, 410-2, . . . , and 410-n or the second election-homomorphic encrypted messages 430-1, 430-2, . . . , and 430-n may have at least one slot. Here, at least one slot of the first election-homomorphic encrypted messages 410-1, 410-2, . . . , and 410-n or the second election-homomorphic encrypted messages 430-1, 430-2, . . . , and 430-n may each correspond to at least one candidate running for the first election or at least one candidate running for the second election. In addition, the first election-homomorphic encrypted messages 410-1, 410-2, . . . , and 410-n or the second election-homomorphic encrypted messages 430-1, 430-2, . . . , and 430-n may have the value of 1 in a slot corresponding to the candidate voted for by the voter in the first or second election, and the value of zero in the other slots among at least one slot.

Meanwhile, the candidate corresponding to each slot of the first election-homomorphic encrypted message is not necessarily the same as the candidate corresponding to each slot of the second election-homomorphic encrypted message, and may be different therefrom.

The slots of the first election-homomorphic encrypted messages 410-1, 410-2, . . . , and 410-n in FIG. 4 may respectively correspond to the candidates a, b, c, and d of the first election, and the slots of the second election-homomorphic encrypted messages 430-1, 430-2, . . . , and 430-n may respectively correspond to candidates e, f, g, and h of the second election. In this case, the candidate e, f, g or h of the second election may be the same candidate as the candidate a, b, c or d of the first election, or may be a candidate different from the candidate a, b, c or d.

The processor 220 may generate the candidate mask for one candidate running for each election. For example, the processor 220 may generate the first candidate mask 420 corresponding to the first candidate in the first election and the second candidate mask 440 corresponding to the second candidate in the second election.

The first candidate mask 420 may have at least one slot corresponding to each candidate running for the first election. In detail, the first candidate mask 420 may have the same number of slots as the number of candidates running for the first election, and each slot of the first candidate mask 420 may correspond to each candidate running for the first election.

In addition, the first candidate mask 420 may have the value of 1 in a slot corresponding to the first candidate and the value of zero in the other slots among at least one slot. For example, the candidates for the first election, a, b, c, and d, may sequentially correspond to four slots of the first candidate mask 420. In this case, the first candidate mask 420 for the first candidate b may have the value of 1 in the second slot and the value of zero in the other slots.

Similarly, the second candidate mask 440 may have at least one slot corresponding to each candidate running for the second election. In detail, the second candidate mask 440 may have the same number of slots as the number of candidates running for the second election, and each slot of the second candidate mask 440 may correspond to each candidate running for the second election. FIG. 4 shows that the second candidate mask 440 having four slots assuming that there are four candidates for the second election. However, the second candidate mask 440 may have three slots in case that there are three candidates for the second election.

In addition, the second candidate mask 440 may have the value of 1 in a slot corresponding to the second candidate and the value of zero in the other slots among at least one slot. For example, the candidates for the second election, e, f, g and h, may sequentially correspond to four slots of the second candidate mask 440. In this case, the second candidate mask 440 for the second candidate e may have the value of 1 in the first slot and the value of zero in the other slots.

The processor 220 may generate the first vote-homomorphic encrypted message including the voting data of the respective voters for the first candidate by using the first election-homomorphic encrypted messages 410-1, 410-2, . . . , and 410-n of the respective voters and the first candidate mask 420, and generate the second vote-homomorphic encrypted message including the voting data of the respective voters for the second candidate by using the second election-homomorphic encrypted messages 430-1, 430-2, . . . , and 430-n of the respective voters and the second candidate mask 440.

In detail, the processor 220 may generate the first vote-homomorphic encrypted message by homomorphically dot-producing the first election-homomorphic encrypted messages 410-1, 410-2, . . . , and 410-n of the respective voters and the first candidate mask 420, and generate the second vote-homomorphic encrypted message by homomorphically dot-producing the second election-homomorphic encrypted messages 430-1, 430-2, . . . , and 430-n of the respective voters and the second candidate mask 440. Here, the homomorphic dot-product calculation indicates summing values acquired by multiplying each value in the slot of the election-homomorphic encrypted message by that of the candidate mask.

Here, the first vote-homomorphic encrypted message or the second vote-homomorphic encrypted message may have one slot. 1 may be a value in the slot of the first vote-homomorphic encrypted message in case that the voter votes for the first candidate, and zero in the other cases; and 1 may be a value in the slot of the second vote-homomorphic encrypted message in case that the voter votes for the second candidate, and zero in the other cases.

For example, the first vote-homomorphic encrypted message including one slot having a value of $(1 \times 0)+(0 \times 1)+(0 \times 0)+(0 \times 0)=0$ may be generated as a result of homomorphically dot-producing the first election-homomorphic encrypted message 410-1 and the first candidate mask 420. In addition, the second vote-homomorphic encrypted message having a value of $(1 \times 0) \pm (0 \times 1) \pm (0 \times 0) \pm (0 \times 0)=1$ may be generated as a result of homomorphically dot-producing the second election-homomorphic encrypted message 430-1 and the second candidate mask 440.

The processor 220 may generate the vote-homomorphic encrypted message including the voting data of the voter for the first and second candidates by homomorphically multiplying the first vote-homomorphic encrypted message by the second vote-homomorphic encrypted message.

The vote-homomorphic encrypted message may have one slot. Here, 1 may be a value in the slot of the vote-homomorphic encrypted message in case that the voter votes for both the first candidate and the second candidate, and zero in the other cases.

As described above, 1 may be a value in the slot of the first vote-homomorphic encrypted message in case that the voter votes for the first candidate, and zero in the other cases; and 1 may be a value in the slot of the second vote-homomorphic encrypted message in case that the voter votes for the second candidate, and zero in the other cases. Accordingly, 1 may be the value in the slot of the vote-homomorphic encrypted message acquired by homomorphically multiplying the first vote-homomorphic encrypted message and the second vote-homomorphic encrypted message in case that the voter votes for both the first candidate and the second candidate, and zero in the other cases.

For example, in the case shown in FIG. 4, the value in the slot of the first vote-homomorphic encrypted message of the voter P1 may be $(1 \times 0) \pm (0 \times 1) \pm (0 \times 0) \pm (0 \times 0)=0$; and the value in the slot of the second vote-homomorphic encrypted message may be $(1 \times 1) \pm (0 \times 0) \pm (0 \times 0) \pm (0 \times 0)=1$. Accordingly, the value in the slot of the vote-homomorphic encrypted message of the voter P1 may be $0 \times 1=0$. In addition, the value in the slot of the first vote-homomorphic encrypted message of the voter P2 may be $(0 \times 0) \pm (1 \times 1) \pm (0 \times 0) \pm (0 \times 0)=1$; and the value in the slot of the second vote-homomorphic encrypted message may be $(1 \times 1)+(0 \times 0)+(0 \times 0)+(0 \times 0)$ $=1$. Accordingly, the value in the slot of the vote-homomorphic encrypted message of the voter P2 may be $1 \times 1=1$.

The processor 220 may generate the result-homomorphic encrypted message including the number of voters who select the first candidate and the second candidate by using the vote-homomorphic encrypted message of the respective voters.

In detail, the processor 220 may generate the result-homomorphic encrypted message by homomorphically summing the vote-homomorphic encrypted messages of the respective voters.

As described above, the vote-homomorphic encrypted message of the respective voters may have one slot, and 1 may be a value in the slot in case that the respective voters select the first candidate and the second candidate. Accordingly, the result-homomorphic encrypted message may have one slot, and a value in the slot may be the same as the number of voters who select the first candidate and the second candidate.

For example, K may be the number of voters who select the first candidate and the second candidate among the voters P1 to Pn in FIG. 4. In this case, K may be the value in the slot of the result-homomorphic encrypted message.

Meanwhile, FIG. 4 shows only the first and second elections. However, even if there are three or more elections, the mask homomorphic encrypted message and the vote-homomorphic encrypted message may be generated in the same way by using the above method, and the result-homomorphic encrypted message may be generated based on the generated mask homomorphic encrypted message and vote-homomorphic encrypted message.

Meanwhile, the processor 220 may store the generated result-homomorphic encrypted message in the form of the data frame (or table). In detail, the processor 220 may generate the result-homomorphic encrypted message for each candidate in the first election and each candidate in the second election by using the method described above with reference to FIG. 4, and store the generated result-homomorphic encrypted message in the form of one frame (or table).

FIG. 5 is a view for explaining the data frame in which the result-homomorphic encrypted message is stored according to an embodiment of the disclosure.

The processor 220 may generate the table (or data frame) of the dimension corresponding to the number of times of the plurality of elections. Here, each dimension of the generated table may include at least one index, and each index may correspond to a candidate running for each election.

The candidate in each election may correspond to the index of each dimension of the table, and the processor 220 may thus generate the table having the number of cells multiplied by the number of candidates running for the plurality of elections.

The processor 220 may store the generated result-homomorphic encrypted message in one of the plurality of cells included in the generated table. Here, a position where the result-homomorphic encrypted message is stored may be determined based on a candidate of the result-homomorphic encrypted message.

For example, in case that two elections are held, the processor 220 may generate a table having two dimensions. Here, an index on an x-axis at the table having two dimensions may include the candidate in the first election, and an index on a y-axis may include the candidate in the second election. Meanwhile, this configuration is only an example, and the index on the y-axis may include the candidate in the first election, and the index on the x-axis may include the candidate in the second election. There may be the candidates a, b, and c for the first election, and the candidates a and b for the second election. In this case, the processor 220 may generate a table including indices 1, 2, and 3 respectively corresponding to the candidates a, b, and c on the x-axis, and indices 1 and 2 corresponding to the candidates a and b on the y-axis. Here, the table may have a size of 3×2=6.

In addition, the result-homomorphic encrypted message may be generated using the first candidate mask of the first candidate in the first election and the second candidate mask of the second candidate in the second election. That is, the result-homomorphic encrypted message may be the result-homomorphic encrypted message including the number of voters who select the first candidate and the second candidate. In this case, the result-homomorphic encrypted message may be stored in [a, b] corresponding to the first candidate in the first election of the table and the second candidate in the second election.

For example, in case of an example described with referenced to FIG. 5, the result-homomorphic encrypted message including the number of voters who select the first candidate and the second candidate may be stored in [2, 1] of a table 510.

Meanwhile, the result-homomorphic encrypted messages may be stored in the form of a table having the plurality of dimensions even in case that the elections are held twice or more. For example, the result-homo encrypted including the number of voters who select the first candidate who is an i-th candidate in the first election, the second candidate who is a j-th candidate in the second election, and the third candidate who is a k-th candidate in the third election may be stored in [i, j, k] of a table having three dimensions.

FIG. 6 is a flowchart for explaining a method for generating a homomorphic encrypted message according to another embodiment of the disclosure.

The method may include generating a vote-homomorphic encrypted message including voting data of respective voters for a first candidate and a second candidate by using a first candidate mask corresponding to the first candidate in a first election and a second candidate mask corresponding to a second candidate in a second election, for a plurality of election-homomorphic encrypted messages acquired by homomorphically encrypting the voting data on votes of the respective voters in the plurality of elections (S610).

Here, the election-homomorphic encrypted message may have at least one slot corresponding to each candidate running for the first or second election. In addition, 1 may be a value in a slot corresponding to a candidate voted for by the voter in the first election or the second election, and zero in the other slots among at least one slot of the election-homomorphic encrypted message.

In addition, a first candidate mask and a second candidate mask including at least one slot may be generated. The first candidate mask may have at least one slot corresponding to each candidate running for the first election, and may have the value of 1 in a slot corresponding to the first candidate, and the value of zero in the other slots among at least one slot of the first candidate mask. Similarly, the second candidate mask may have at least one slot corresponding to each candidate running for the second election, and may have the value of 1 in a slot corresponding to the second candidate, and the value of zero in the other slots among at least one slot of the second candidate mask.

The generated vote-homomorphic encrypted message may have one slot. Here, 1 may be a value in the slot of the vote-homomorphic encrypted message in case that the voter votes for both the first candidate and the second candidate, and zero in the other cases.

The method may include generating a result-homomorphic encrypted message including the number of voters who select the first candidate and the second candidate by using the vote-homomorphic encrypted message (S620).

In detail, the result-homomorphic encrypted message may be generated by homomorphically summing the vote-homomorphic encrypted messages of the respective voters.

In more detail, a first vote-homomorphic encrypted message including the voting data of the respective voters for the first candidate may be generated by using first election-homomorphic encrypted messages acquired by homomorphically encrypting the voting data of the respective voters in the first election and the first candidate mask corresponding to the first candidate in the first election; and a second vote-homomorphic encrypted message including the voting data of the respective voters for the second candidate may be generated by using second election-homomorphic encrypted messages acquired by homomorphically encrypting the voting data of the respective voters in the second election and the second candidate mask corresponding to the second candidate in the second election. In addition, the vote-homomorphic encrypted message including the voting data of the voter for the first candidate and the second candidate may be generated by homomorphically multiplying the first vote-homomorphic encrypted message by the second vote-homomorphic encrypted message.

Here, the first vote-homomorphic encrypted message or the second vote-homomorphic encrypted message may have one slot.

1 may be a value in the slot of the first vote-homomorphic encrypted message in case that the voter votes for the first candidate, and zero in the other cases. 1 may be a value in the slot of the second vote-homomorphic encrypted message in case that the voter votes for the second candidate, and zero in the other cases.

Meanwhile, a table having dimensions corresponding to the number of times of the plurality of elections may be generated.

In addition, the generated result-homomorphic encrypted message may be stored in one of a plurality of cells included in the generated table.

The various operations described above as being performed by the electronic apparatus 200 may be performed by one or more electronic apparatuses in the form of a control method or an operation method of a system including the electronic apparatus.

Meanwhile, the various embodiments of the disclosure described above may be implemented in a computer or a computer-readable recording medium using software, hardware, or a combination of software and hardware.

According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

Meanwhile, a computer instruction for performing the method for generating the homomorphic encrypted message of the electronic apparatus according to the various embodiments of the disclosure described above may be stored in a non-transitory computer-readable medium. The computer instructions stored in the non-transitory computer-readable medium allow a specific device to perform the processing operations of the user device or the administrator device according to the various embodiments described above in case that the instructions are executed by a processor of the specific device described above.

The non-transitory computer readable medium is not a medium that temporarily stores data, such as a register, a cache, or a memory, and indicates a medium that semi-permanently stores data and is readable by a machine. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, or a read only memory (ROM).

Although the embodiments of the disclosure have been shown and described, the disclosure is not limited to the above-described specific embodiments, and may be variously modified by those skilled in the art to which the disclosure pertains without departing from the spirit and scope of the disclosure as claimed in the claims. In addition, such modifications should also be understood to fall within the scope of the disclosure.

What is claimed is:

1. An electronic apparatus comprising:
a memory storing at least one instruction and a plurality of election-homomorphic encrypted messages acquired by homomorphically encrypting voting data on votes of a plurality of voters in a plurality of elections; and
a processor configured to execute the at least one instruction,
wherein the processor is configured to:
generate a vote-homomorphic encrypted message including the voting data of the voter for a first candidate and a second candidate by using a first candidate bin mask corresponding to the first candidate in a first election and a second candidate bin mask corresponding to the second candidate in a second election, for a first election-homomorphic encrypted message acquired by homomorphically encrypting the voting data of the voter in the first election and a second election-homomorphic encrypted message acquired by homomorphically encrypting the voting data in the second election,
generate a result-homomorphic encrypted message including the number of voters who select the first candidate and the second candidate by using the generated vote-homomorphic encrypted message,
generate a first vote-homomorphic encrypted message including the voting data of the respective voters for the first candidate by using the first election-homomorphic encrypted messages of the respective voters and the first candidate bin mask,
generate a second vote-homomorphic encrypted message including the voting data of the respective voters for the second candidate by using the second election-homomorphic encrypted messages of the respective voters and the second candidate bin mask, and
generate the vote-homomorphic encrypted message including the voting data of the voter for the first candidate and the second candidate by homomorphically multiplying the first vote-homomorphic encrypted message by the second vote-homomorphic encrypted message, wherein the first candidate bin mask has plurality of slots corresponding to each candidate running for the first election, and 1 is a value in a slot corresponding to the first candidate, and zero in the other slots among the plurality of slots of the first candidate bin mask, and
the second candidate bin mask has plurality of slots corresponding to each candidate running for the second election, and 1 is a value in a slot corresponding to the second candidate, and zero in the other slots among the plurality of slots of the second candidate bin mask,
wherein the processor is configured to
generate a table having dimensions corresponding to the number of times of the plurality of elections, and
store the result-homomorphic encrypted message in one of a plurality of cells included in the generated table,
wherein each dimension of the generated table includes at least one index, and the at least one index includes information on which candidates ran in each election, and
wherein the homomorphic encryption scheme supports both additive and multiplicative homomorphism, forming a structure closed under both operations.

2. The apparatus as claimed in claim 1, wherein the first election-homomorphic encrypted message or the second election-homomorphic encrypted message has at least one slot,
the at least one slot of the first election-homomorphic encrypted message or the second election-homomorphic encrypted message corresponds to at least one candidate running for the first election or the second election, and
1 is a value in a slot corresponding to a candidate voted for by the voter in the first election or the second election, and zero in the other slots among the at least one slot.

3. The apparatus as claimed in claim 1, wherein the vote-homomorphic encrypted message has one slot,
1 is a value in the slot of the vote-homomorphic encrypted message in case that the voter votes for both the first candidate and the second candidate, and zero in the other cases, and
the processor is configured to generate the result-homomorphic encrypted message by homomorphically summing the vote-homomorphic encrypted messages of the respective voters.

4. The apparatus as claimed in claim 1, wherein the first vote-homomorphic encrypted message or the second vote-homomorphic encrypted message has one slot,
1 is a value in the slot of the first vote-homomorphic encrypted message in case that the voter votes for the first candidate, and zero in the other cases, and
1 is a value in the slot of the second vote-homomorphic encrypted message in case that the voter votes for the second candidate, and zero in the other cases.

5. A method for generating a homomorphic encrypted message including voting analysis data, the method comprising:
generating a vote-homomorphic encrypted message including voting data of respective voters for a first candidate and a second candidate by using a first candidate bin mask corresponding to the first candidate in a first election and a second candidate bin mask corresponding to the second candidate in a second election, for a plurality of election-homomorphic encrypted messages acquired by homomorphically encrypting the voting data of the respective voters in a plurality of elections, and

21 generating a result-homomorphic encrypted message including the number of voters who select the first candidate and the second candidate by using the generated vote-homomorphic encrypted message, wherein the generating of the vote-homomorphic encrypted message includes:

generating a first vote-homomorphic encrypted message including the voting data of the respective voters for the first candidate by using first election-homomorphic encrypted messages acquired by homomorphically encrypting the voting data of the voters in the first election and the first candidate bin mask corresponding to the first candidate in the first election;

generating a second vote-homomorphic encrypted message including the voting data of the respective voters for the second candidate by using second election-homomorphic encrypted messages acquired by homomorphically encrypting the voting data of the voters in the second election and the second candidate bin mask corresponding to the second candidate in the second election; and generating the vote-homomorphic encrypted message including the voting data of the voter for the first candidate and the second candidate by homomorphically multiplying the first vote-homomorphic encrypted message by the second vote-homomorphic encrypted message, wherein the first candidate bin mask has plurality of slots corresponding to each candidate running for the first election, and 1 is a value in a slot corresponding to the first candidate, and zero in the other slots among the plurality of slots of the first candidate bin mask, and the second candidate bin mask has plurality of slots corresponding to each candidate running for the second election, and 1 is a value in a slot corresponding to the second candidate, and zero in the other slots among the plurality of slots of the second candidate bin mask, further comprising:

generating a table having dimensions corresponding to the number of times of the plurality of elections; and storing the result-homomorphic encrypted message in one of a plurality of cells included in the generated table, wherein each dimension of the generated table includes at least one index, and the at least one index includes information on which candidates ran in each election, and wherein the homomorphic encryption scheme supports both additive and multiplicative homomorphism, forming a structure closed under both operations.

6. The method as claimed in claim 5, wherein the election-homomorphic encrypted message has at least one slot corresponding to each candidate running for the first election or the second election, and 1 is a value in a slot corresponding to a candidate voted for by the voter in the first election or the second election, and zero in the other slots among the at least one slot.

7. The method as claimed in claim 5, wherein the vote-homomorphic encrypted message has one slot, 1 is a value in the slot of the vote-homomorphic encrypted message in case that the voter votes for both the first candidate and the second candidate, and zero in the other cases, and in the generating of the result-homomorphic encrypted message, the result-homomorphic encrypted message is generated by homomorphically summing the vote-homomorphic encrypted messages of the respective voters.

8. The method as claimed in claim 5, wherein the first vote-homomorphic encrypted message or the second vote-homomorphic encrypted message has one slot, 1 is a value in the slot of the first vote-homomorphic encrypted message in case that the voter votes for the first candidate, and zero in the other cases, and 1 is a value in the slot of the second vote-homomorphic encrypted message in case that the voter votes for the second candidate, and zero in the other cases.

9. A non-transitory computer-readable recording medium which includes a program for executing a method for generating a homomorphic encrypted message including voting analysis data, wherein the method includes:

generating a vote-homomorphic encrypted message including voting data of respective voters for a first candidate and a second candidate by using a first candidate bin mask corresponding to the first candidate in a first election and a second candidate bin mask corresponding to the second candidate in a second election, for a plurality of election-homomorphic encrypted messages acquired by homomorphically encrypting the voting data of the respective voters in a plurality of elections, and generating a result-homomorphic encrypted message including the number of voters who select the first candidate and the second candidate by using the generated vote-homomorphic encrypted message, wherein the generating of the vote-homomorphic encrypted message includes:

generating a first vote-homomorphic encrypted message including the voting data of the respective voters for the first candidate by using first election-homomorphic encrypted messages acquired by homomorphically encrypting the voting data of the voters in the first election and the first candidate bin mask corresponding to the first candidate in the first election;

generating a second vote-homomorphic encrypted message including the voting data of the respective voters for the second candidate by using second election-homomorphic encrypted messages acquired by homomorphically encrypting the voting data of the voters in the second election and the second candidate bin mask corresponding to the second candidate in the second election; and generating the vote-homomorphic encrypted message including the voting data of the voter for the first candidate and the second candidate by homomorphically multiplying the first vote-homomorphic encrypted message by the second vote-homomorphic encrypted message, wherein the first candidate bin mask has plurality of slots corresponding to each candidate running for the first election, and 1 is a value in a slot corresponding to the first candidate, and zero in the other slots among the plurality of slots of the first candidate bin mask, and the second candidate bin mask has plurality of slots corresponding to each candidate running for the second election, and 1 is a value in a slot corresponding to the second candidate, and zero in the other slots among the plurality of slots of the second candidate bin mask, further comprising:

generating a table having dimensions corresponding to the number of times of the plurality of elections; and storing the result-homomorphic encrypted message in one of a plurality of cells included in the generated table, wherein each dimension of the generated table includes at least one index, and the at least one index includes information on which candidates ran in each election, and wherein the homomorphic encryption scheme supports both additive and multiplicative homomorphism, forming a structure closed under both operations.

* * * * *